US005274460A

United States Patent [19]

Yamada et al.

[11] Patent Number: 5,274,460

[45] Date of Patent: Dec. 28, 1993

[54] METHOD OF AND APPARATUS FOR REWRITABLE RECORDING AND ERASING AND REWRITABLE RECORDING FILM

[75] Inventors: Keiki Yamada; Masaru Ohnishi, both of Kamakura, Japan

[73] Assignee: Mitsubishi Denki Kabushiki Kaisha, Tokyo, Japan

[21] Appl. No.: 725,619

[22] Filed: Jul. 3, 1991

[30] Foreign Application Priority Data

| | | | |
|---|---|---|---|
| Jul. 4, 1990 | [JP] | Japan | 2-176758 |
| Feb. 20, 1991 | [JP] | Japan | 3-45689 |
| Jun. 7, 1991 | [JP] | Japan | 3-162284 |

[51] Int. Cl.5 ........................ G01D 15/16; G01D 9/00; G01D 15/10; H04N 1/38

[52] U.S. Cl. ................................ 358/296; 346/76 L; 346/135.1; 346/139 A

[58] Field of Search ................ 358/296; 346/21, 76 L, 346/135.1, 139 A; 101/141, 142, 181; 400/630, 708, 583.3; 430/290; 355/212

[56] References Cited

U.S. PATENT DOCUMENTS

| | | | |
|---|---|---|---|
| 3,683,336 | 8/1972 | Brownlee et al. | 340/173 LS |
| 3,716,844 | 2/1973 | Bradsky | 346/76 L X |
| 3,789,420 | 1/1974 | Claytor et al. | 346/76 L X |
| 4,025,025 | 5/1977 | Bartel et al. | 101/181 |
| 4,695,528 | 9/1987 | Dabisch et al. . | |
| 4,700,200 | 10/1987 | Hibino | 346/76 PH |
| 4,720,707 | 1/1988 | Konishi et al. | 346/139 A X |
| 4,734,359 | 3/1988 | Oguchi et al. | 346/135.1 X |
| 4,765,654 | 8/1988 | Nakamura . | |
| 4,837,071 | 6/1989 | Tagoku et al. | 428/195 |
| 4,983,496 | 1/1991 | Newell et al. | 346/76 L X |

FOREIGN PATENT DOCUMENTS

| | | | |
|---|---|---|---|
| 418399 | 3/1991 | European Pat. Off. . | |
| 461606 | 12/1991 | European Pat. Off. . | |
| 57-117140 | 7/1982 | Japan . | |
| 60-54878 | 3/1985 | Japan | 400/583.3 |
| 62-116190 | 5/1987 | Japan . | |
| 62-116191 | 5/1987 | Japan . | |
| 0207672 | 8/1988 | Japan | 400/583.3 |
| 0236667 | 10/1988 | Japan | 400/708 |
| 9011898 | 10/1990 | PCT Int'l Appl. . | |

*Primary Examiner*—Benjamin R. Fuller
*Assistant Examiner*—Eric Frahm
*Attorney, Agent, or Firm*—Rothwell, Figg, Ernst & Kurz

[57] ABSTRACT

In a rewritable recording apparatus using a recording medium 1 having a recording layer which exhibits a color developing property when a first kind of heat energy is applied thereto and a tone reducing property when a second kind of heat energy is applied thereto, a recording-energisation control section 34 supplies an image recording signal corresponding to a desired display image to a heating device 3 to cause it to generate heat with the first kind of heat energy. This heating device 3 imparts the first kind of heat energy to the recording medium 1, whereby a desired display image is recorded on the recording medium 1. An erasure control section 35 supplies an image erasing signal corresponding to a desired erasing range to the heating device 3 so as to cause it to generate heat with the second kind of heat energy. This heating device 3 imparts the second kind of heat energy to the recording medium 1, whereby the image recorded on the recording medium 1 is erased.

5 Claims, 9 Drawing Sheets

PHENOLIC HYDROXYL GROUP (GROUP EXHIBITING COLOR DEVELOPING PROPERTY) → OPENING LACTONE RINGS OF LEUCO DYE COLORING

AMINE GROUP OF CARBOXYLIC ACID → FORMATION OF LACTONE RINGS (RESTORATION TO COLORLESS LEUCO DYE)

COLORLESS LEUCO COMPOUND

COLORED LEUCO COMPOUND

METHOD OF AND APPARATUS FOR REWRITABLE RECORDING AND ERASING AND REWRITABLE RECORDING FILM

BACKGROUND OF THE INVENTION

1. Field of the Invention

This invention relates to a method of and an apparatus for recording and erasing using a film which allows repeated recording and erasing (a rewritable recording film), and to such a rewritable recording film.

2. Description of the Related Art

Because of their relatively simple construction, recording means like thermal recording apparatus or thermal transfer recording apparatus, in which a thermal head or the like is used to record image information on a recording medium such as paper, are being widely used as recording units in various apparatus including printers and facsimile apparatus.

As an example of such recording means, a recording unit for a facsimile apparatus using a thermal recording sheet will be described. The recording unit basically operates as follows: First, when a recording signal is supplied to the recording unit of the facsimile apparatus, heating elements of the thermal head are selectively energized to generate heat with a predetermined timing in accordance with this recording signal, thereby developing color at desired positions on the thermal recording sheet so as to form an image thereon.

With such a conventional recording unit in a facsimile apparatus or the like, an image once formed on a thermal recording sheet by developing color thereon cannot be erased. Therefore, it is impossible to form a different desired image on the same recording sheet.

As a result, the operating cost of such units is high. Particularly in the case of low-priced and economical facsimile units, for example, for the home, it is necessary to keep costs down to a minimum.

In view of this, rewritable recording films allowing repeated recording and erasion have recently been developed with a view to reducing operating costs or to improving a man-machine interface for balance inscription on a prepaid card or the like. Examples of such rewritable recording films include the resin type or the organic low-molecular-weight-material-type films (hereinafter referred to as "the cloudy-type" films) disclosed in Japanese Patent Laid-Open No. 55-154198, 57-82086, 02-117891, etc, and those disclosed in WO 90/11898, Japanese Patent Laid-Open No. 02-188294, etc.

Being constructed as described above, the conventional recording/display apparatuses are not capable of recording an image on a recording medium on which some other image has already been recorded, which means a large amount of recording medium must inevitably be used. Further, for a rewritable recording medium to be re-used, perfect erasability is indispensable for practical use, and there has been no method or apparatus for recording and erasing or a rewritable recording film available which satisfies this condition.

To discuss the point in more detail, there is the problem that a perfect erasure cannot be attained even in a case where a desired image is formed selectively with a first kind of heat energy and entirely erased with a second kind of heat energy. Specifically, in the case, for example, of a reflection-type cloudy film, in which a metal reflective layer of aluminum or the like is provided under the recording layer that is formed of a resin/organic-low-molecular-weight material, those portions on the film where selective recording had been effected can be visually perceived as such even after they have been erased, which means a perfect erasure has not been achieved. It may be assumed that this is attributable to the fact that those film portions where erasure has been effected subsequent to recording are different from those where erasure has been effected with no previous recording in terms of the transparency and reflecting condition of the recording layer. Further, in the case of a dye-type film, it may also be assumed that a perfect erasure is made impossible by the difference between those film portions where erasure has been effected subsequent to recording and those where it has been effected with no previous recording in terms of the erasing condition of the recording layer.

Further, notwithstanding the fact that an exact positional control must be performed during the recording/erasing operation, if a perfect erasure is to be achieved, no such positional control has conventionally been performed. The prior-art techniques, have thus remained short of perfection in erasing.

In addition, in the case where the same thermal head as is used for recording is used as the heating means for erasing the presence of small gaps between the heating elements will allow some film portions to remain unerased.

SUMMARY OF THE INVENTION

This invention has been made with a view to solving the above problems. It is accordingly an object of this invention to provide a method of and an apparatus for rewritable recording and erasing and a rewritable recording film which allow erasure and re-recording of images. This invention also aims to make it possible to effect the erasure of a recorded image reliably, easily and economically.

In order to achieve the above object, according to one aspect of the present invention, there is provided a method of rewritable recording and erasing comprising the steps of: effecting full-face recording on a rewritable recording film with a first kind of heat energy; erasing the recording with a second kind of heat energy; and then effecting ordinary recording and erasing the above-mentioned rewritable recording film being designed such as to allow a colored image to be formed thereon for recording or display with the first kind of heat energy and as to allow this colored image to be erased therefrom with the second kind of heat energy, thus making it possible to repeatedly effect the formation and erasure of colored images.

According to another aspect of this invention, there is provided a rewritable recording film comprising: a recording surface designed such as to allow a colored image to be formed thereon for recording or display with a first kind of heat energy and as to allow this colored image to be erased therefrom with a second kind of heat energy, thus making it possible to repeatedly effect the formation and erasure of colored images; and markers previously recorded on the rewritable recording film so as to indicate predetermined positions.

According to still another aspect of this invention, there is provided a rewritable recording apparatus of the type using a rewritable recording film which is designed such as to allow a colored image to be formed thereon for recording or display with a first kind of heat energy and as to allow this colored image to be erased therefrom with a second kind of heat energy, thus making it possible to repeatedly effect the formation and erasure of colored images, the above-mentioned recording apparatus comprising: at least one heating means adapted to effect heating with the first or the second kind of heat energy; a recording control means adapted to supply an image recording signal corresponding to a desired image to the heating means to cause it to generate heat with the first kind of heat energy; an erasure control means adapted to supply an image erasing signal corresponding to a desired erasing range to the heating means to cause it to generate heat with the second kind of heat energy; a detection means adapted to detect a marker recorded on the rewritable recording film or the leading edge of the rewritable recording film to emit a detection signal; and a position control means adapted to perform position control on the rewritable recording film during recording and erasing in accordance with the output of the detection means.

DESCRIPTION OF THE PREFERRED EMBODIMENTS

Figure 1A:
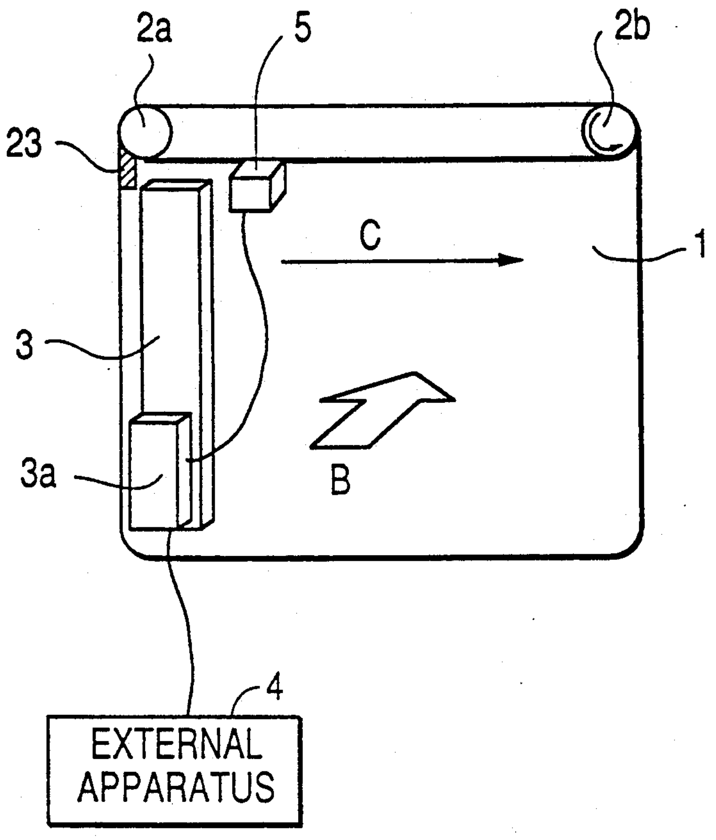
FIGS. 1A and 1B are schematic diagrams showing a rewritable recording apparatus in accordance with a first embodiment of this invention.

In the rewritable recording/erasing method of the present invention, full-face recording is effected with a first kind of heat energy, and then erasure is effected with a second kind of heat energy. Afterwards, ordinary recording and erasing are effected.

Further, to adjust the positions on the rewritable film where the recording and erasing of images are effected, it is expedient to previously record markers at predetermined positions on the recording film.

In the case where no markers are previously recorded on the film or in the case where a more exact control on the recording and erasing positions is to be performed, it is expedient to provide a marker recording means which serves to record markers on the recording film.

Further, to effect the recording and erasing of images at proper positions on the recording film in accordance with the markers recorded thereon, it is expedient to provide: at least one heating means adapted to perform heating with a first or a second kind of heat energy; a recording control means adapted to supply an image recording signal corresponding to a desired image to this heating means to cause it to generate heat with the first kind of heat energy; an erasure control means adapted to supply an image erasing signal corresponding to a desired erasing range to the above-mentioned heating means to cause it to generate heat with the second kind of heat energy; a detection means adapted to detect a marker recorded on the rewritable recording film or the leading edge of the rewritable recording film to emit a detection signal; and a position control means adapted to perform positional control for recording and erasing operations in accordance with the output from this detection means.

Further, to save the trouble of erasing an image, it is expedient to provide a record erasing means, which, when performing image recording operation by the above recording control means, previously operates the above-mentioned erasing control means for erasing the unnecessary image portions on the recording film.

To reliably erase an image, it is expedient to adopt at least one heating means for generating heat with a first or a second kind of heat energy which is so designed that, assuming the heating area per pixel during recording is S1 and the heating area per pixel during erasing is S2, the following relationship holds true: $S1 \leqq S2$.

In accordance with the rewritable recording erasing method of the present invention, full-face recording is effected with a first kind of heat energy, and then erasing is effected with a second kind of heat energy. Afterwards, ordinary recording and erasing are effected. Thus, even when full-face erasure is effected subsequent to selective recording, the recorded portions can be perfectly erased. This is due to the fact that those portions of the recording film where erasure is effected subsequent to recording and those where it is effected without any previous recording are equalized by effecting full-face recording with the first kind of heat energy and then effecting erasure. As a result, a recording film which is free from any visible residual image (i.e., a film which allows perfect erasure) can be obtained.

Any marker recorded on the recording film is detected by the detection means, and, in accordance with the results of this detection, the recording/erasing positions on the recording film can be controlled precisely. Such markers may be recorded on the recording film by a marker recording means as needed.

Further, by virtue of the recording control means, the erasing control means, or the recording/erasion control means, erasing operation can be performed when performing recording operation, thus facilitating the renewal of recorded images. In other words, recording and erasing are effected apparently at the same time, making it possible to easily effect the recording of a desired image on a film on which recording has been previously performed.

Further, in at least one heating means for the recording film, the heating area per pixel S2 at the time of erasure is equal to or larger than the heating area per pixel S1 at the time of recording, so that the erasure range is larger than the recording range, whereby the erasure of recorded images can be reliably effected by the heating means.

EMBODIMENT 1

Figure 1B:
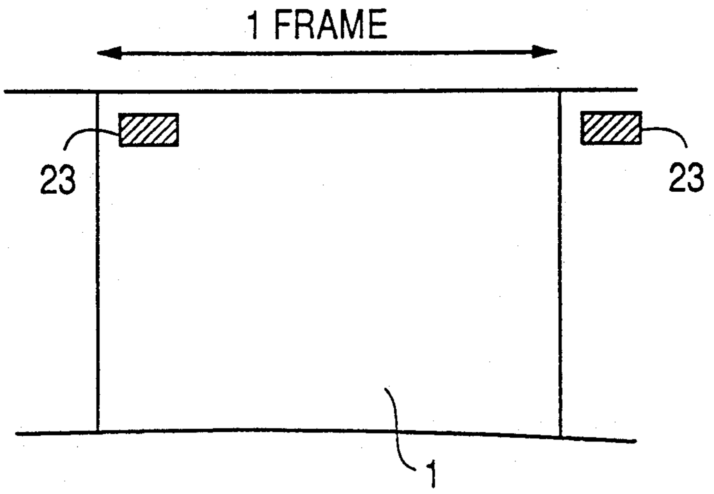

FIGS. 1A and 1B show the first embodiment of the present invention. FIG. 1A is a schematic diagram showing the construction of a rewritable recording apparatus which is used as a test printer for a word processor, as an electronic blackboard, etc. In the drawing, the reference numeral 1 indicates a recording medium having a recording layer, which exhibits a color developing property by the application of a first kind of heat energy $h_1$ to allow the formation of a colored (e.g., blue) image. In a normal environment (in terms of temperature and humidity), this recording layer has a memory capacity. When a second kind of heat energy $h_2$ is applied thereto, this recording layer exhibits a tone reducing property to cause the recorded image to be erased, and, when the first kind of heat energy $h_1$ is applied to it again, it exhibits a color developing characteristic to allow a colored (e.g., blue) image to be formed and, in a normal environment (in terms of temperature and humidity), has a memory capacity, thus allowing the formation and erasure of images to be effected repeatedly. The rewritable recording medium 1 is in the form of an endless film, on which, as shown in FIG. 1B, a marker 23 is formed for each frame. These markers 23 serve as marks indicating predetermined positions and have different optical reflectances. In this embodiment, these markers 23 are used for controlling the film feeding, the erasing start time, etc.

In this embodiment, support means 2*a* and 2*b* are spaced away from each other by a distance corresponding to one frame and support an endless belt on which the above-mentioned rewritable recording medium 1 is attached. The support means 2*a* and 2*b* of this embodiment consist of rollers formed of a rubber-like material and can be selectively rotated by a motor or the like (not shown) either to the right or to the left in accordance with the recording or erasing conditions. They are adapted to rotate at the same speed to effect frame feeding of the rewritable recording medium 1, and, at the same time, capable of rotating at different speeds to eliminate any deflection in the rewritable recording medium 1.

A heating means 3 applies a first or a second kind of heat energy to the rewritable recording medium 1. That is, when performing recording or erasing, the heating means 3 is pressed against the support means 2*a* to apply the first or the second kind of heat energy to the rewritable recording medium 1 so as to record or erase information on the medium. In this embodiment, this heating means 3 consists of a heating head such as a thermal head. The length of this heating means 3 approximately corresponds to the width of the rewritable recording medium 1. Assuming, for example, the visual range of the rewritable recording medium 1 is A4 size, approximately 2500 heating elements (not shown) may exist on the heating means 3.

A control unit 3*a* includes a recording control means which supplies an image recording signal corresponding to a desired display image to the above heating means 3 to cause it to generate heat with the first kind of heat energy, and an erasing control means which supplies an image erasing signal corresponding to a desired erasing range to the above heating means 3 to cause it to generate heat with the second kind of heat energy.

An external apparatus 4, which generates an image recording signal and an image erasing signal to be supplied to the control unit 3, constitutes an image data generation source, which consists, for example, of a computer or a word processor. Further, a detection means 5 detects the markers recorded on the rewritable recording medium 1 or the leading edge of the rewritable recording medium 1 to emit a detection signal.

Figure 2A:
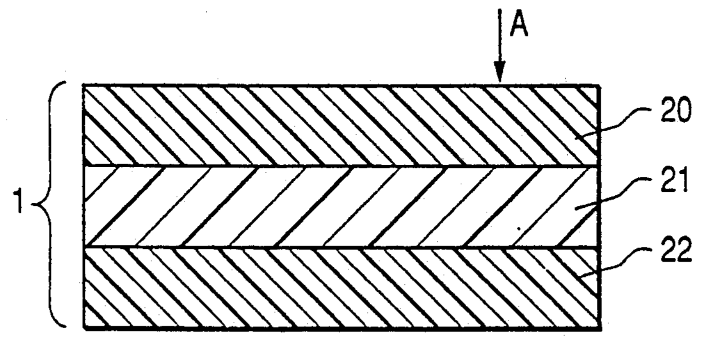
FIGS. 2A, 2B and 2C are diagrams illustrating a rewritable recording medium 1 used in this invention.

As shown in FIG. 2A, the rewritable recording medium 1 comprises: a base 22; a recording layer 21 which is formed on this base 22 and which consists of a leuco dye, a developing/tone-reducing agent adapted to thermally react with this leuco dye to effect development or tone reduction, a binder, etc.; and a protective layer 20 which is formed on this recording layer 21 and which helps to improve durability.

When the first kind of thermal energy $h_1$ which is at high temperature and of short duration, for example, heat energy at a high temperature of approximately 200° to 350° C. and of a duration of approximately 1 to 3 msec, is applied to this rewritable recording medium 1 in the direction indicated by the arrow A, a colored (e.g., blue) image is formed. On the other hand, when the second kind of heat energy $h_2$ which is at low temperature and of long duration, for example, heat energy at a low temperature of approximately 80° to 150° C. and of a duration of approximately 5 msec to 2 sec, is applied, the image once formed is erased.

Figure 2B:
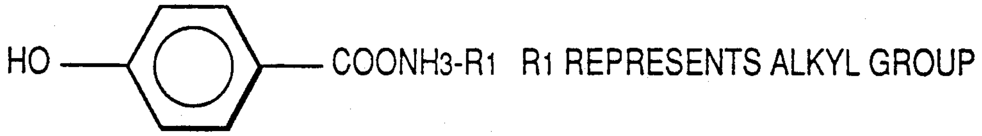

Next, the construction of the rewritable recording medium 1 will be described more specifically. The developing/tone-reducing agent in the recording layer 21 consists of a compound which, as shown in FIG. 2B, has in the same molecule a group which exhibits a color developing property with respect to the leuco dye by thermal action and a group which exhibits a tone reducing property with respect to the leuco dye by thermal action. This compound is a salt, for example, of a phenolic carboxylic acid and an organic amine, which exhibits an acid or a base characteristic by thermal action.

Generally, a leuco dye thermally reacts with a phenolic compound, with the lactone rings thereof being opened to effect change from a colorless to a colored state. However, when this colored compound with the open lactone rings comes into contact with a base substance, the lactone rings thereof are closed again and the compound is restored to the original colorless state where the lactone rings are closed.

Figure 2C:
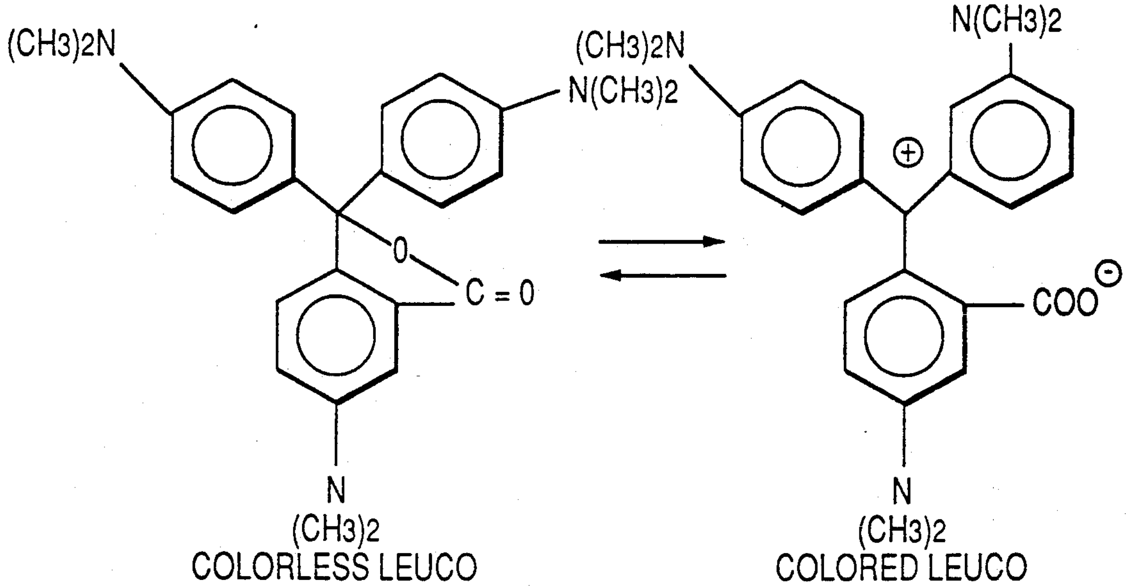

By virtue of the above phenomenon, i.e., the reversibility of the developing/tone-reducing agent and the leuco dye illustrated in FIG. 2C, this developing/tone-reducing agent can change the leuco dye, solely through heat energy control, to a colored compound or restore it to the original colorless state, with their lactone rings being opened or closed.

In performing recording and erasing with a rewritable recording apparatus, the following four methods are available. These methods will be described with reference to a case where characters are displayed on a dye-type recording film.

(1) A method in which characters are recorded for display on a white background with a first kind of heat energy (which is at high temperature) and erased with a second kind of heat energy (which is at low temperature) (Colored characters are recorded on a white background);

② A method in which those original portions which are other than characters are recorded and displayed on a white background with a first kind of heat energy (which is at high temperature) and erased with a second kind of heat energy (which is at low temperature) (The characters are recorded white on a colored background);

e,crc/3/ A method in which full-face printing (i.e., full-face coloring) is first effected with a first kind of heat energy (which is at high temperature). Afterwards, characters are recorded and displayed with a second kind of heat energy (which is at low temperature), and then full-face printing is performed with the first kind of heat energy to effect erasion (The characters are recorded white on a colored background); and ④ A method in which full-face printing (i.e., full-face coloring) is effected with a first kind of heat energy (which is at high temperature). Afterwards, those original portions which are other than characters are recorded and displayed with a second kind of heat energy (which is at low temperature), and then full-face printing is performed with the first kind of heat energy to effect erasure (Colored characters are recorded on a white background). In the case of cloudy-type rewritable films, the "white background" in the above ① through ④ may be replaced by the color of the recording film (i.e., the color of the same when nothing is recorded thereon, e.g., silver), and the "colored" in the above ① through ④ may be replaced by the recording color (e.g., white).

In rewritable recording, "ordinary recording" as mentioned above can be effected with either the first or the second kind of heat energy. In this invention, the above method ① is described. In the case of the methods ② through ④, some variation in expression will be entailed. For example, the first kind of energy may be used for erasing, with the second being used for recording. Enlarging the heating area for erasure implies the enlargement of the heating area of the heating means using the first kind of heat energy. This is attributable to the positive/negative relationship.

Next, the operation of the rewritable recording apparatus having the above-described construction will be described.

First, when the power source (not shown) is turned ON, a motor or the like (not shown) is operated by a motor control means or the like (not shown) to rotate the support means *2a* and *2b* counterclockwise, feeding the rewritable recording means 1 in the direction indicated by the arrow C of FIG. 1. When a marker 23 indicative of a recording (image formation) start position on the rewritable recording means 1 has reached a position under a detection means 5, a detection signal from the detection means 5 instructs the motor control means or the like to stop the film feeding, causing the rewritable recording medium 1 to stop at a predetermined position.

Image recording on the rewritable recording medium in this condition is performed as follows:

Image information in the form of characters, figures, etc. prepared by a word processor or the like constituting the external apparatus 4, or image information read by means of a scanner or the like, is transferred to the control unit *3a* along with control commands. The control commands serve, for example, to indicate the recording mode, the image information size, the recording start, etc. Further, the external apparatus 4 and the control unit *3a* are connected to each other through a predetermined interface.

The control commands transmitted from the external apparatus 4 are successively interpreted in the control unit *3a* and transferred therefrom to the heating means 3 as voltage pulse signals representing a bit image line by line. Then, electricity is supplied to the corresponding heating elements of the heating means 3 for a predetermined period to cause them to generate heat, transmitting the Joule heat thereof (the first kind of heat energy) to the rewritable recording medium 1. As a result, the rewritable recording medium 1 develops color in accordance with the information for one line. Then, the rewritable recording medium 1 is fed by one line by the support means *2a* and *2b* rotated by the motor or the like (not shown) in the direction of the arrow C of FIG. 1A, and the control unit *3a* transfers a voltage pulse signal corresponding to the next one-line bit image of the image information to the heating means 3, causing the rewritable recording medium 1 to develop color in the same manner as described above. These operations are successively repeated to record one-frame image information on the rewritable recording medium 1.

The erasure of the image recorded on the rewritable recording medium 1 is effected as follows: First, by the motor control means or the like (not shown), the motor or the like (not shown) operates to cause the support means *2a* and *2b* to rotate counterclockwise, feeding the rewritable recording medium 1 in the direction indicated by the arrow C of FIG. 1A. When, a marker 23 indicative of an image erasing start position has reached the position under the detection means 5, a detection signal from the detection means 5 instructs the motor control means or the like (not shown) to stop the film feeding, causing the rewritable recording medium 1 to stop at a predetermined position.

Then, the erasing mode is indicated by a control command from the external apparatus 4. The control unit *3a* starts the erasing operation upon receiving an erasing mode command.

That is, the heating means 3 transfers a signal that is identical with the data at the time of recording or all-black data (data for causing heating elements to generate heat), causing heat generation for a predetermined time. The heat energy applied in this process, however, is the second kind of heat energy, which is applied for a relatively long period at a relatively low temperature, whereby one-line image information is erased. Then, the rewritable recording medium 1 is fed by one line, erasing one-line image information in the same manner as above. This operation is repeated to erase one-frame image information from the rewritable recording medium 1. This rewritable recording medium 1, on which erasing has been thus effected, allows re-recording of image information in the manner described above.

EMBODIMENT 2

While in the first embodiment described above one frame image is entirely erased from the image on the rewritable recording medium 1, it is also possible to erase an arbitrarily designated range (indicated by the broken line in FIGS. 3B and 3C) of one-frame information or information recorded in a plurality of frames.

Figure 3A:
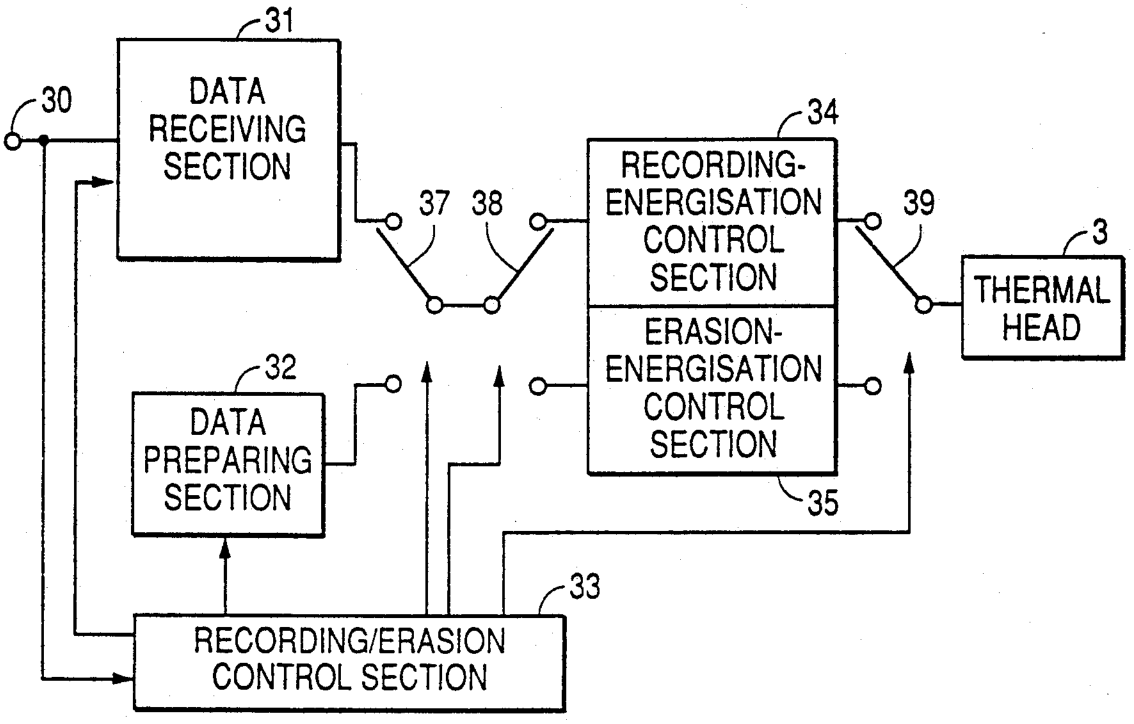
FIG. 3A is a block diagram showing a control unit in a second embodiment of this invention.
Figure 3B:
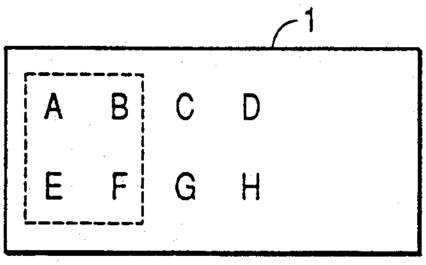
FIGS. 3B and 3C are diagrams showing those image portions on the rewritable recording medium 1 which are to be erased.
Figure 3C:
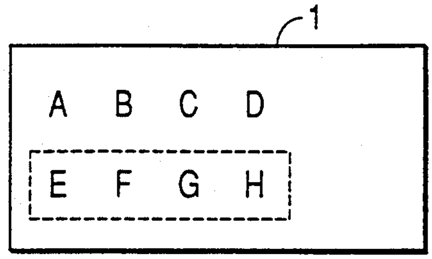

FIGS. 3A through 3C show an embodiment for effecting such a partial erasure, of which FIG. 3A is a block diagram showing the construction of the control unit 3*a*.

In the recording mode, any control command supplied to an input terminal 30 of this control unit 3*a* is interpreted by a recording erasing control section 33. At the same time, image information is received by a data receiving section 31. By a signal from the recording/erasing control section 33, selectors 37, 38 and 39 are selected to the upper side (as seen in the drawing), and the image information received by the data receiving section 31 is transferred as an image recording signal to the heating means 3 consisting of a thermal head by way of a recording-energization control section 34, which serves to set the energizing pulse width for obtaining the first kind of heat energy needed at the time of recording and to control the heating means 3 consisting of a thermal head, thus constituting, together with the above-mentioned data receiving section 31, a recording control means for effecting recording control on the heating means 3.

In the erasing mode, any control command supplied to the input terminal 30 is interpreted by the recording/erasion control section 33, and the control command is followed. That is, when commands to the effect: "erase only the lower half of the frame" (an erasure command and a coordinate command indicative of the erasing position), which corresponds to FIG. 3C, are supplied to the input terminal, the recording/erasing control section 33 indicates the erasing pattern to a data preparing section 32. In effecting erasing in accordance with the erasing pattern shown in FIG. 3C, the data preparing section 32 prepares erasing pattern data in which the upper half of the frame corresponds to a "0" signal (a non-heat-generation signal) and in which the lower half of the frame corresponds to a "1" signal (a heat-generation signal). Further, by a signal from the recording/erasing control section 33, the selectors, 37, 38 and 39 are selected to the lower side (as seen in the drawing. The erasing pattern data prepared by the data preparing section 32 is transferred through the selectors 37 and 38 to an erasure-energisation control section 35, where an image erasing signal is generated. On the basis of this image erasing signal, the heating means 3 is controlled to erase the range indicated by the broken line of FIG. 3C.

The recording/erasing control section 33, the data preparing section 32, and the erasing-energisation control section 35, which are operated in the erasing mode constitute an erasing control means. Since the recording/erasing control section 33 interprets a control command and causes the data preparing section 32 to prepare erasing pattern data, it is also possible erase a range as indicated by the broken line of FIG. 3B, thus allowing the erasure of an arbitrary range.

EMBODIMENT 3

While in the first embodiment described above one-frame information is erased, it is also possible to erase a plurality of frames at one time. Further, a device for emitting erasing commands may be attached to the apparatus.

Figure 4:
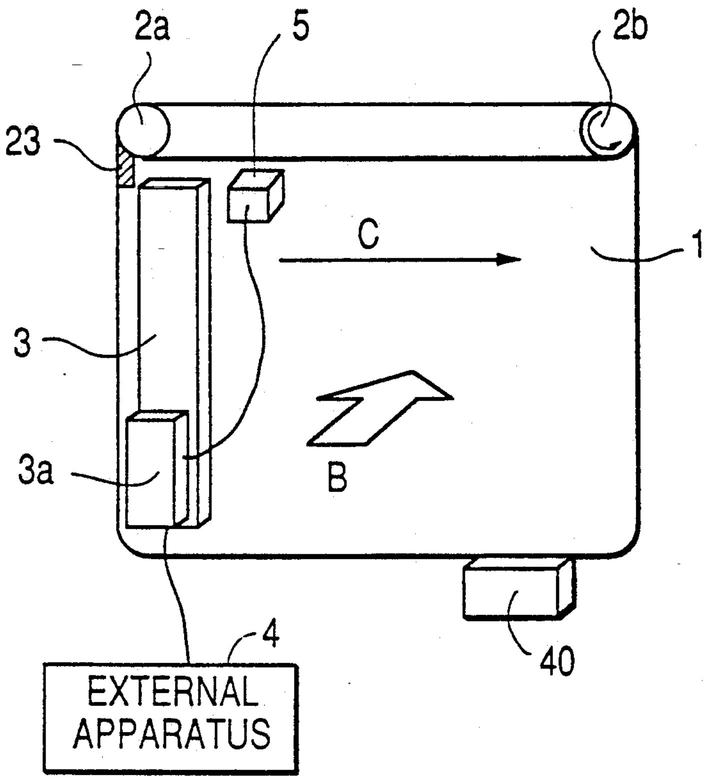
FIG. 4 is a schematic diagram showing a rewritable recording apparatus in accordance with a third embodiment of this invention.
Figure 5:
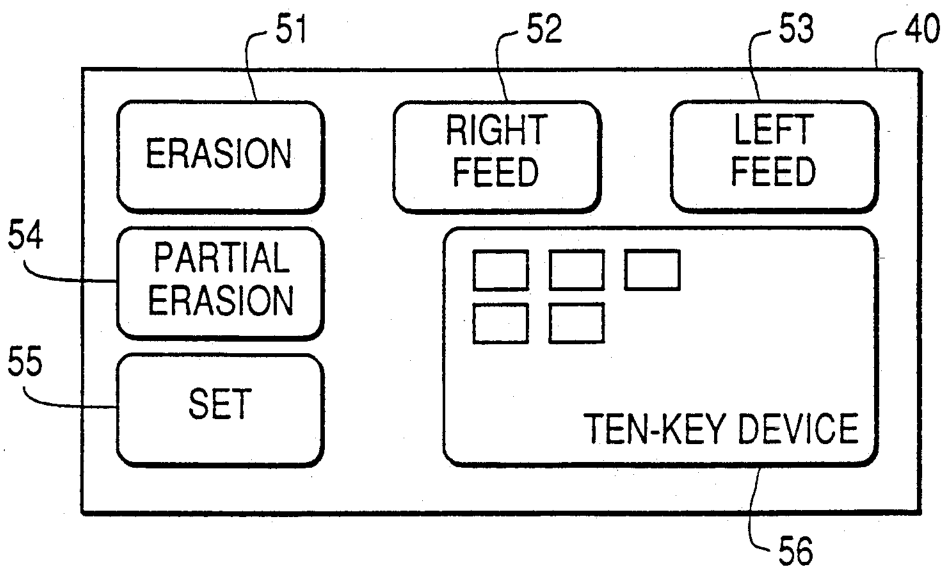
FIG. 5 is a diagram illustrating an operation panel 40 in the third embodiment of this invention.

FIGS. 4 and 5 show such an apparatus, which constitutes a third embodiment of the present invention. In the drawing, an operation panel 40 is provided at a position under the rewritable recording medium 1. An erasure key 51 provided on this operation panel 40 is used when giving an image erasure command. A right-feed key 52 provided on the operation panel 40 is used when giving a command to feed the rewritable recording medium 1 to the right. A left-feed key 53 provided on the operation panel 40 and used when giving a command to feed the rewritable recording medium 1 to the left. A partial erasure key 54 provided on the operation panel 40 is used when giving a partial erasure command. A set key 55 serves to set key-input data given by the above-mentioned keys provided on the operation panel 40. A ten-key device 56 provided on the operation panel 40 is used when entering information such as an erasure range.

Also in Embodiment 3, constructed as described above, operations similar to those of Embodiment 1 are performed in the recording and erasure modes. In particular, examples of operation performed by the operation panel 40 will be described. When erasing one-frame image entirely, the key "1" of the ten-key device 56, the erasure key 51, and the set key 55 are sequentially depressed in that order to set the apparatus to one-frame erasure and the control unit shown in FIG. 3A effects the one-frame erasure.

When erasing image information recorded two frames entirely, the key "2" of the ten-key device 56, the erasure key 51, and the set key 55 are sequentially depressed in that order to set the apparatus to two-frame erasure, and the control unit shown in FIG. 3A effects the two-frame erasion.

Further, when erasing a designated range only, the coordinates corresponding to the range to be erased are entered by the ten-key device 56, and by depressing the partial erasure key 54 and the set key 55, the apparatus is set to the partial erasure of the desired range. The recording/erasure control section 33 of the control unit shown in FIG. 3A interprets the command to effect the desired partial frame erasure.

Next, the operation of the apparatus of the present invention will be described. Referring to FIGS. 1A and 3A, all-black data (recording data) is transmitted to the recording-energisation control section 34 to cause the thermal head 3 to perform full-face recording. Such data is prepared by the data preparing section 32 and supplied through the selectors 37 and 38 to the recording-energisation control section 34. Then, the data is transmitted from the recording-energisation control section 34 to the thermal head 3 to cause it to generate heat in such a manner as to provide a desired level of density, and the motor (not shown) and the support means 2*a* and 2*b* effect the line feeding of the recording medium to perform the heating/recording operation. This operation is repeated to effect full-face recording. Afterwards, the selectors 38 and 39 are switched to the lower side to transmit the data to the erasure-energisation control section 35, effecting full-face erasure in substantially the same manner as in the above full-face recording. The reason for effecting full-face erasure after effecting full-face recording is to realize a perfect erasion as stated above. The full-face recording and full-face erasure may be effected at the time of shipment, or when replacing the rewritable recording film 1 with a new one, or when the rewritable recording film 1 has become completely incapable of perfect erasion as a result of secular change, or when effecting recording and erasure selectively. Further, when effecting full-face recording or fill-face erasure of the order of a visual range, fixed data may be used, so that it is possible to prepare the data by the recording-energisation control section 34 or the erasure-energisation control section 35 and supply it to the thermal head 3. (With this arrangement, the data preparing section 32 can be dispensed with.) Further, in a case where two or more heating means, e.g., thermal heads 3, are used, as described below, the apparatus may be so designed that the control over the erasure side (the heating-means side where the same full-face recording can be effected by high-temperature or low-temperature recording) can be performed through signal control solely indicating whether heating is to be effected or not, whereby a still more economic structure can be realized.

EMBODIMENT 4

While in the first embodiment described above the recording (image formation) start position and the image erasing position are indicated by the markers 23 provided on the rewritable recording medium 1, the following arrangement may be adopted to effect a still more perfect erasion.

That is, in the recording mode, a marker 23 provided on the rewritable recording medium 1 is detected by the detection means 5, which emits a detection signal. After a predetermined period has elapsed after the reception of the detection signal from this detection means, image recording on the rewritable recording medium 1 is started. In the erasure mode, a marker 23 provided on the rewritable recording medium 1 is detected by the detection means 5, and, immediately after the reception of a detection signal from this detection means, the erasure of the image on the rewritable recording medium 1 is started.

Due to this arrangement, the image erasure range in the erasure mode becomes larger than the image recording range in the recording mode, thereby improving the precision in erasure.

EMBODIMENT 5

Figure 6:
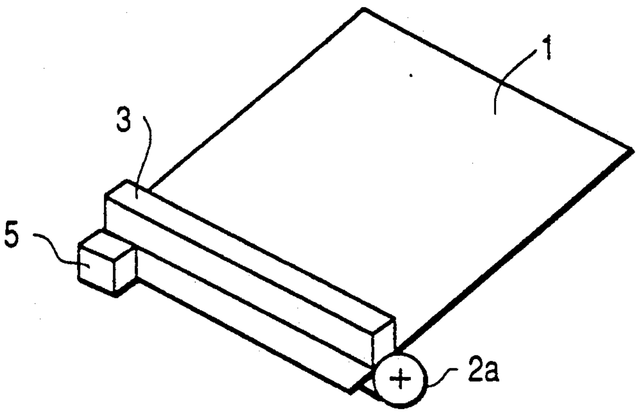
FIG. 6 is a perspective view showing the essential part of a rewritable recording apparatus in a fifth embodiment of this invention.

While in the above-described embodiments the rewritable recording medium 1 is in the form of an endless belt, it is also possible for the rewiitable recording medium 1 to be in the form of a cut paper sheet as shown in FIG. 6.

With this arrangement, the same operation as that of Embodiment 1 is performed, with the same effect being obtained.

Further, in this Embodiment 5, the rewritable recording medium 1 may be provided with markers 23, as in the embodiments described above, so as to enable the image formation start position and the image erasure start position to be detected. Further, instead of providing markers 23, the apparatus may also be designed such that the leading edge of the rewritable recording medium 1 is detected by the detection means 5, thereby enabling the image formation start position and the image erasure start position to be detected.

EMBODIMENT 6

While in the above embodiments the rewritable recording medium 1 is provided with markers 23, it is also possible to use a rewritable recording medium 1 on which no markers 23 are formed.

Figure 7A:
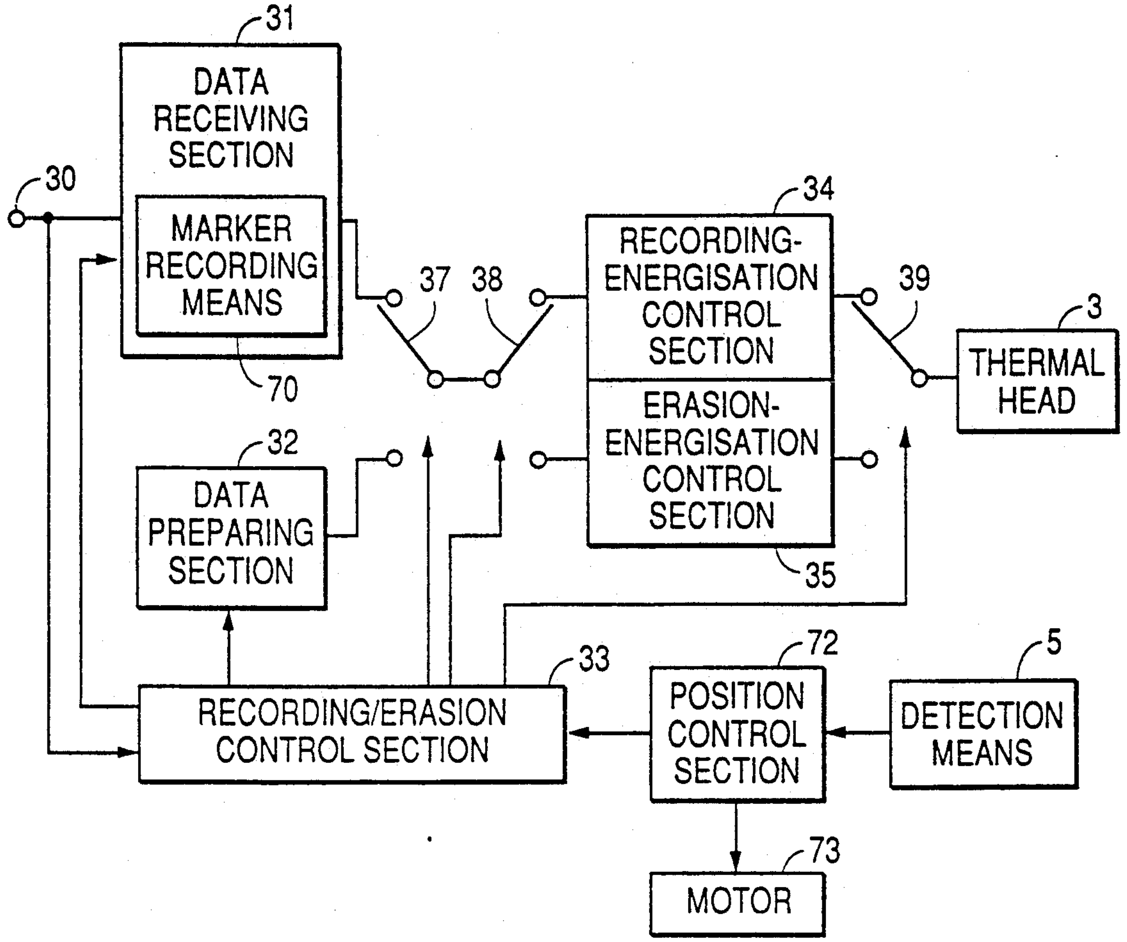
FIG. 7A is a block diagram of a control unit in a sixth embodiment of this invention.

In that case, markers may be recorded on the rewritable recording medium 1 by means of the heating means 3, providing a marker recording means 70 in the data receiving section 31, as shown in FIG. 7A.

Figure 7B:
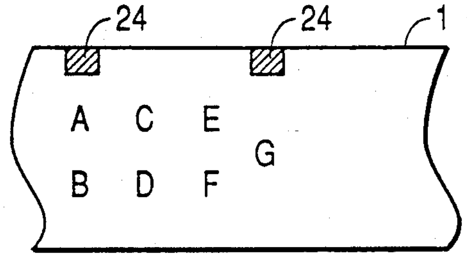
FIGS. 7B and 7C are diagrams illustrating markers 24 recorded on the rewritable recording medium 1.
Figure 7C:
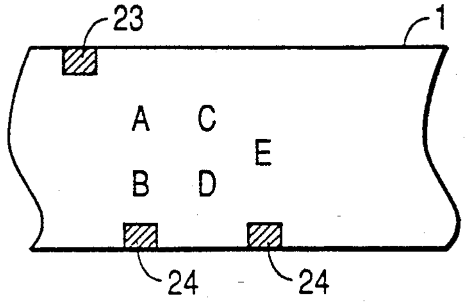

For example, this marker recording means 70 detects, in the recording mode, the start and end of image information and supplies to the recording-energisation control section 34 a marker formation signal for giving, at the time of the start or end of the image information, the first kind of heat energy to the heating means 3, which is at a predetermined position with respect to the rewritable recording medium 1, for example, at a position corresponding to the upper end section of the recording medium, as shown in FIG. 7B.

Further, in FIG. 7A, the reference numeral 72 indicates a position control means, which controls, in the erasion mode, the motor or the like 73, which is adapted to rotate the support means *2a* and *2b* at a speed which is suitable for image erasure, in accordance with a detection signal from the detection means 5. At the same time, this position control means 72 controls the recording/erasion control section 33 so as to control the start and end positions for image erasing operation.

In this Embodiment 6, recording markers 24 are formed on the rewritable recording medium 1 by the marker recording means 70 simultaneously with the image recording on the rewritable recording medium 1. As shown in FIG. 7B, these recording markers 24 are formed such that the images recorded on the rewritable recording mediums 1 are positioned between them.

When erasing an image on the rewritable recording medium 1, a control command indicating the erasing mode is supplied to the input terminal 30 and interpreted by the recording/erasing control section 33. Then, the rewritable recording medium 1 is fed at high speed by the erasing motor 73 or the like and through the support means *2a* and *2b*. When the detection means 5 detects a recording marker 24, the position control means 72 causes the motor 73 to rotate at a speed suitable for image erasure, in accordance with a detection signal from this detection means 5. At the same time, the position control means 72 instructs the recording/erasing control means 33 to start erasing, causing it to perform image erasure. Afterwards, when the detection means 5 detects another recording marker 24, the position control means 72 causes the motor 73 to rotate at high speed again in accordance with a detection signal from the detection means 5, feeding the rewritable recording means 1. When one frame has been fed, the feeding of the rewritable recording medium 1 is stopped, thus ending the image erasing operation.

In this Embodiment 6, only those ranges which are between recording markers 24 are erased. That is, the electricity supplied to the heating means 3 can be reduced accordingly. Furthermore, since those portions of the rewritable recording medium 1 on which no image is recorded can be fed at high speed, the requisite time for erasure can also be reduced.

While in Embodiment 6 no markers 23 are formed on the rewritable recording medium 1, the same effect can be obtained if a marker 3 indicative of the leading edge of a frame is provided on the rewritable recording medium 1.

Further, while in Embodiment 6 recording markers 24 are recorded on the rewritable recording medium 1 by the marker recording means 70 with respect to both the start and end positions for image erasure, it is also possible for the recording marker 24 to be recorded only with respect to the image erasure start position.

In that case, image erasure is started by detecting the recording marker 24 indicative of the image erasure start position, with the control over the image erasure end position being managed with the time elapsing after the detection of the erasure position or the number of lines fed.

EMBODIMENT 7

While in the above embodiments re-recording is performed on a frame on which one-frame erasure has been effected, it is also possible to arrange the re-recording such that the recording of a new image (hereinafter referred to as "the second image") is performed on a frame on which some other image (hereinafter referred to as "the first image") has been recorded, while erasing this first image.

This Embodiment 7 can also have the same construction as that of the above-described embodiments. In the following, the operation of recording the second image while erasing the first image will be described with reference to FIGS. 1 through 3.

When, in the control unit shown in FIG. 3A, a control command of a recording/erasing mode (a mode in which the second image is recorded while erasing the first image) is supplied to the input terminal 30, the recording/erasing control section 33 functions such as to cause the operation of the erasing/recording mode to be performed. In this process, erasing data for one line is first prepared in the data preparing section 32, and the heating means 3 generates heat with the second kind of heat energy, erasing the data on the first line of the first image recorded on the rewritable recording medium 1.

Subsequently, image information on the first line of the second image is transferred to the recording-energisation control section 34 from the data receiving section 31 which has received the second image information from the input terminal 30, and based on this image information, the recording-energisation control section 34 causes the heating means 3 to generate heat with the first kind of heat energy, recording the first line of the second image on that portion of the recording medium from which the first line of the first image has been erased.

Afterwards, the support means *2a* and *2b* are rotated by the motor or the like to feed the rewritable recording medium 1 by one line, repeating the operations of erasion and recording in the manner as described above. By thus repeating these operations, the second, new image which consists of characters, figures, etc. can be recorded succeeding to the first image which has previously been formed.

EMBODIMENT 8

Figure 8:
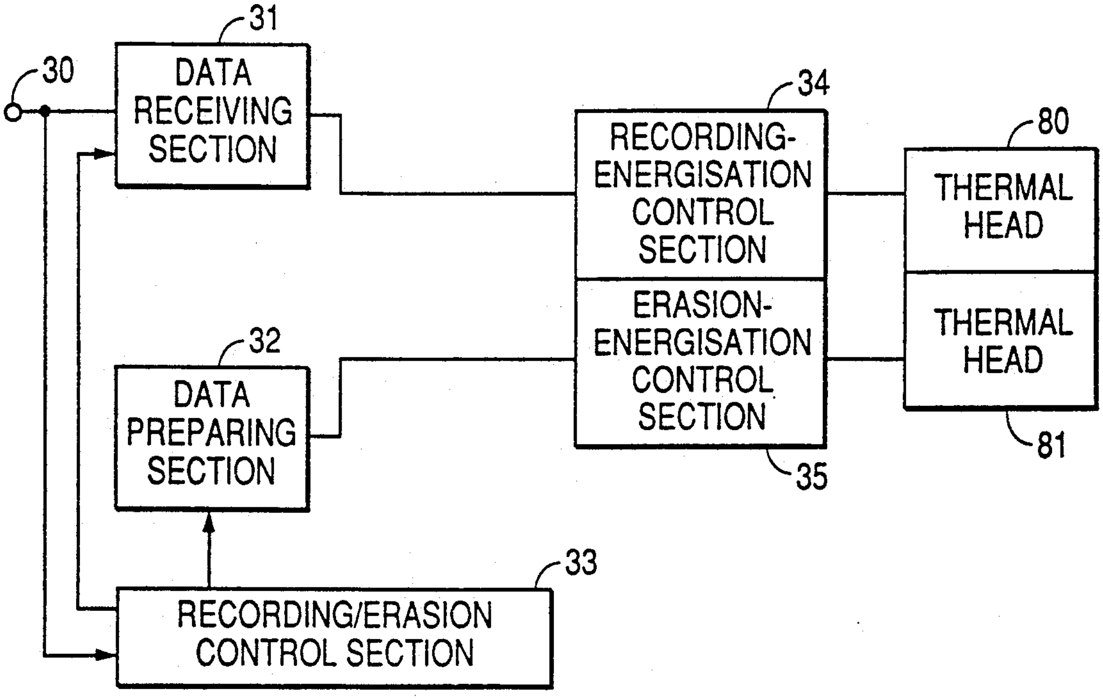
FIG. 8 is a block diagram of a control unit in an eighth embodiment of this invention.

While in the seventh embodiment described above the operations of erasing and recording are performed with a single heating means 3, it is also possible for the heating means to be divided into recording heating means 80 and an erasing heating means 81, as shown in FIG. 8. In this embodiment shown in FIG. 8, the recording and erasing heating means 80 and 81 consist of thermal heads, and, since they are separately provided for recording and erasion, there is no need to provide selectors 37, 38 and 39 as in the embodiment shown in FIG. 3, and the data receiving section 31 is directly connected to the recording-energisation control section 34, with the data preparing section 32 being directly connected to the erasure energisation control section 35.

In this Embodiment 8, the recording heating means 80 and the erasing heating means 81 are arranged side by side or spaced away from each other by a fixed distance such that the latter is positioned before the former with respect to the direction of progress. While the erasing heating means 81 is generating heat with the second kind of heat energy to erase an image on the rewritable recording medium 1, the recording heating means 80 generates heat with the first kind of heat energy to record an image on that part of the rewritable recording medium 1 on which erasure has been effected by the erasing heating means 81.

In some cases, heat generation is started earlier in the erasing heating means 81 than in the recording heating means 80, and in other cases, heat generation is effected simultaneously in both of them. The control of this heat generation timing is effected by the recording/erasing control section 33.

When the heat generation in the recording heating means 80 and that in the erasing heating means 81 are effected simultaneously, the recording/erasing operation can be expedited, and, when the heat generation in the erasing heating means 81 is started earlier than that in the recording heating means 80, a reduction in power consumption can be attained.

EMBODIMENT 9

While in the eighth embodiment described above the heating-element area in the recording heating means 80 and that in the erasing heating means 81 are the same, it is also possible for the heating-element area in the erasing heating means 81 to be made larger than that in the recording heating means 80.

In that case, a recording surface which exhibits no traces of the previous image can be realized on the rewritable recording medium 1 even if, for example, the position at which erasure by the erasing heating means 81 is started is somewhat deviated from the position at which recording by the recording heating means 80 is started.

This will be described in more detail with reference to FIGS. 9A through 9I. In these drawings, the reference numeral 91 indicates a power source, and the reference numeral 92 indicates heating elements in the recording heating means 80 and the erasing heating means 81. By means of a driver IC (not shown) provided in each of them, a switching operation can be performed on these heating elements 92, electric current being selectively supplied to them from the power source to cause heat generation.

Figure 9A:
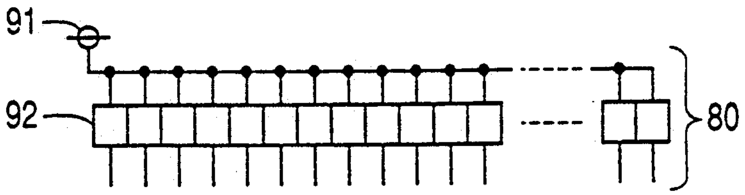
FIGS. 9A through 9I are diagrams showing the construction of heating means 80, 81 in a ninth embodiment of this invention.
Figure 9B:
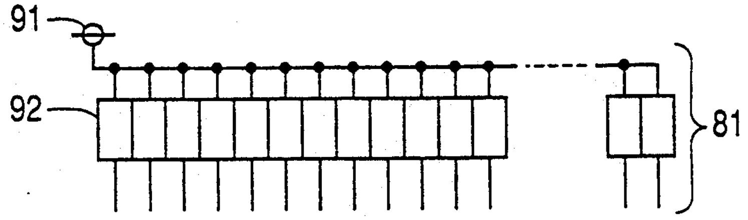
Figure 9C:
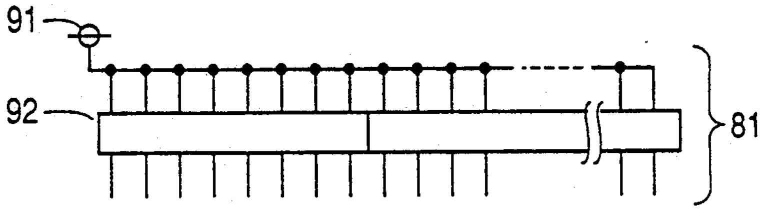

The heating elements 92 of the erasing heating means 81 may be enlarged longitudinally, as shown in FIG. 9B, or laterally, as shown in FIG. 9C, thereby making it possible to effect image erasure reliably.

Figure 9D:
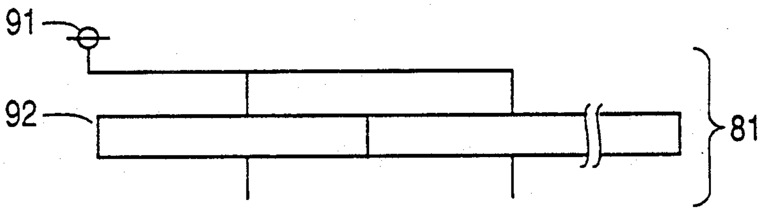

Further, in a case where one-line information is erased by causing all the heating elements 92 in one line, it is possible, as shown in FIG. 9D, to make the heating elements 92 in the erasing heating means 81 large, thereby reducing the wiring between the power source 91 and the driver ICs of the heating elements 92.

Figure 9E:
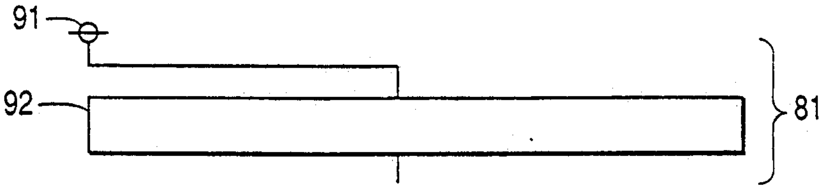

Further, unlike in the recording thermal head 80, the driver ICs for selective heating may be omitted in the erasion thermal head 81, making all the heating elements thereof adapted to generate heat simultaneously. For example, as shown in FIG. 9E, the thermal head may be so designed as to effect switching such that the power source 91 and the heating elements 92 may be connected to each other in the upper section thereof and that electric current flows through the heating elements 92 in the lower section thereof, whereby a more economic construction can be realized. Further, if the temperature of the heating elements 92 can be kept within a desired range, the thermal head may be connected to the ground (not shown), without effecting such switching. Further, to keep the temperature of the heating elements in a desired range, temperature detection elements such as thermistors (not shown) may be attached to the thermal heads 80 and 81 to control the temperature of the generated heat in accordance with the detection results (energisation control). Further, instead of attaching temperature detection elements, the energisation period (the energisation method) for the heating elements may be previously obtained by experiment and used for the controlling of the temperature of the heat generated.

Figure 9F:
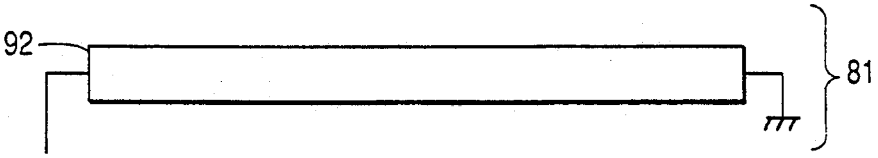
Figure 9G:
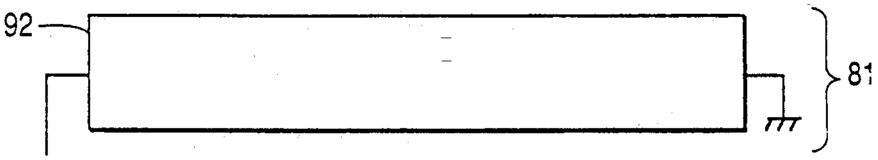
Figure 9H:
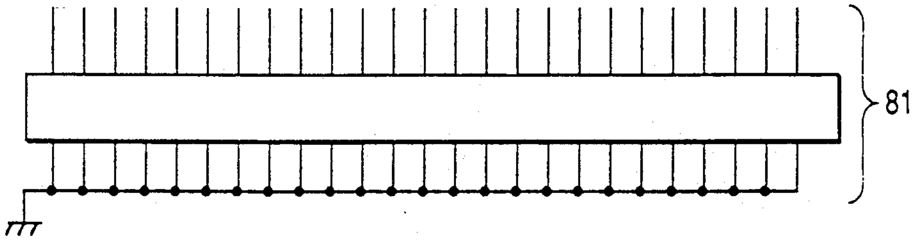

In another construction, which is shown in FIG. 9F, one end of each heating element may be connected to the ground, allowing electric current to flow therethrough by the switching of the other end. Further, the heating element 92 may have a flat configuration as shown in FIG. 9G, or it may have a plurality of wirings as shown in FIG. 9H. The size of the heating elements (e.g., A4 size) and the configuration, number, and construction of the wirings, switching ICs, etc. may be determined arbitrarily. In the present invention, the heating elements 92 for erasing are made larger than the heating elements 92 for recording. The erasing thermal head 81 may be of the type normally used in a facsimile apparatus or the like, and the configuration of the heating elements may be linear or flat. Thus, in this invention, the term "thermal head" is to be understood in a broad sense, and implies all of the above described.

Figure 9I:
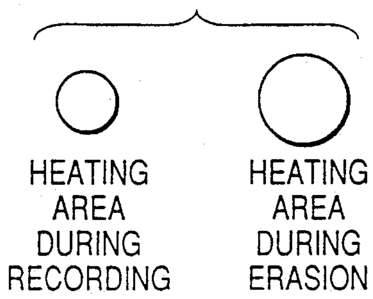

Further, while in the above-described embodiments the heating means consists of thermal heads 3, 80, and 81, this should not be construed as restrictive. Any type of heating means will serve the purpose. Thus, it may also consist of a laser beam source, etc. In that case, the term "heating element area" will be replaced by "heating area". As shown in FIG. 9I, the beam spot of a laser beam or the like, i.e., the heat-generation area, is varied between recording and erasion, making the heating area for erasion larger than that for recording. Specifically, two types of laser beam sources are provided, or two types of lenses for condensing the laser beam from the laser beam source are provided. Or, alternatively, the focal position, is varied between recording and erasing. The configuration of the beam spot may be arbitrarily determined. For example, it may be circular, elliptical, etc. The heating area at the time of recording is adjusted to be equal to or smaller than that at the time of erasing.

The rewritable recording apparatus of the present invention, which has been described with reference to specific embodiments, may be, used independently, or else a plurality of apparatus of this invention may be used in combination. Further, the present invention is not restricted to the above-described embodiments, and various modifications can be made as needed.

For example, while in the above-described embodiments the rewritable recording film 1 consists of a dye-type recording film, this should not be construed as restrictive, and other types of well-known rewritable recording films may be used in this invention. Examples of the other types of films include resin/organic-low-molecular-weight material type films (cloudy-type films), thermochromic-type films, polymer-blend-type films, etc.

Further, while in the above embodiments the same thermal head 3 or 80 is used for the recording of images and markers, it is also possible to provide separate recording means, such as a thermal head, for the recording of markers. The same effect can naturally be obtained if a marker recording means is provided.

While in the above-described embodiments the recording layer 21 in the rewritable recording medium 1 consists of a dye-type recording film, as shown in FIGS. 2B and 2C, this should not be construed as restrictive. Any type of film will serve the purpose as long as it allows repeated recording and erasing. For example, those types of resins which utilize changes with time in transparency, i.e., organic-low-molecular-weight-material-type resins, thermochromic-type resins, or polymer-blend-type resins may be adopted.

Further, while in the above embodiments the heating means 3, the recording heating means 80 and the erasing heating means 81 for effecting recording and erasing on the rewritable recording medium 1 consist of thermal heads, this should not be construed as restrictive. Any type of heating means will serve the purpose. For example, a heating means using a light source, etc. may be adopted.

While in the above-described embodiments the heating means 3, the recording heating means 80 and the erasing heating means 81 consist of stationary-type thermal heads, this should not be construed as restrictive. A scanning-type thermal head may also adopted.

While in the above-described embodiments the same control unit *3a* is used for both recording and erasing, it is also possible to provide separate control units for recording and erasing. The positions of such control units may be determined arbitrarily.

While in the above-described embodiments the heating means 3 is pressed against the support means *2a*, some other type of roller may also be used.

Figure 10:
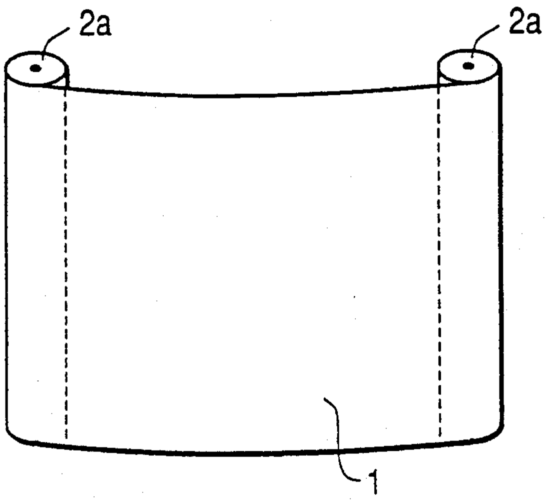
FIG. 10 is a schematic diagram showing an example of another rewritable recording medium 1 in the embodiments of this invention.

While in the above-described embodiments the rewritable recording medium 1 is in the form of an endless belt, this should not be construed as restrictive. As shown in FIG. 10, the recording medium may be of the type which is wound around the support means *2a* and *2b*. Further, it is also possible to adopt a cut-sheet-like or a plate-like recording medium.

While in the above-described embodiments the rewritable recording medium 1 is fed in the lateral direction, it may also be fed in the longitudinal direction.

Further, the number and position of the detection means 5 are not restricted to those of the above-described embodiments. The configuration, number and positions of the markers 23 provided on the rewritable recording medium 1 are not restricted to those of the above embodiments, either. The marker may be something like a barcode.

Regarding the memory capacity of the data receiving section 31 or the data preparing section 32, it may correspond to one line, less than one line, or a plurality of lines, or one or a plurality of frames.

While in the above-described embodiments the data for erasion is generated within the apparatus, it may also be so arranged that the data for erasing is transferred from the external apparatus 4, etc.

Further, while in the above-described embodiments the erasing heating means 81 consists of a thermal head, a heat source such as a heat roller will also serve the purpose.

Figure 11A:
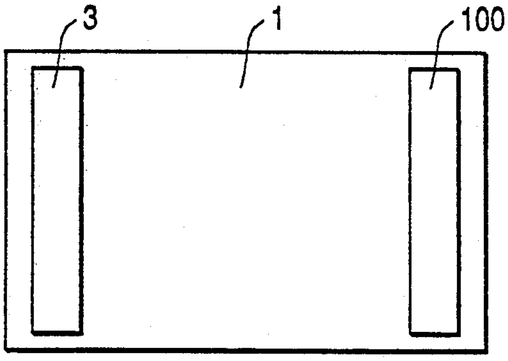
FIGS. 11A and 11B are schematic diagrams showing a rewritable recording apparatus in accordance with another embodiment of this invention.
Figure 11B:
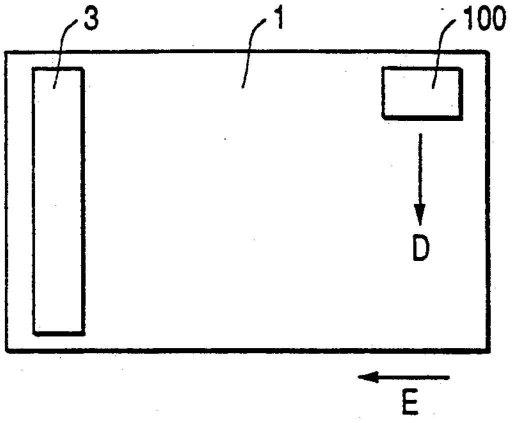

For example, the erasing heating means 81 may consist of an erasing heat source 100 as shown in FIGS. 11A and 11B, which effects a static heat generation (at low temperature and of long duration). The size of this erasing heat source 100 may be the same as that of the recording heating means 3 consisting of a thermal head, as shown in FIG. 11A, or larger or smaller than that.

In the case where the size of the erasing heat source 100 is smaller than that of the recording heating means 3, as shown in FIG. 11B, the erasing heat source 100 is moved in the direction indicated by the arrow D to effect erasing as the rewritable recording medium 1 is moved in the direction indicated by the arrow E. This arrangement helps to attain a reduction in cost.

While in the above-described embodiments the heating means 3, 80 and 81 consist of line-type thermal heads, serial-type thermal heads will also serve the purpose. Further, the same effect can be obtained if one line is divided for successive feeding to effect recording or erasing so as to reduce the power consumption in the heating means 3, 80 and 81.

Further, the number of the heating means 3, 80 and 81 is not limited to that of the above embodiments. The larger the number of heating means, the shorter will be time required for recording or erasing. Further, the number of heating means for recording may be different from that for erasing.

Figure 12A:
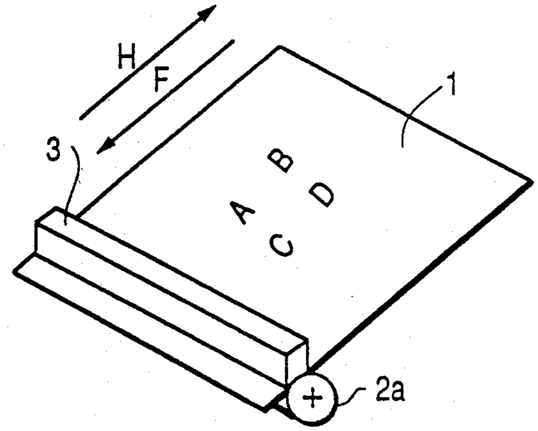
FIGS. 12A and 12B are schematic diagrams showing a rewritable recording apparatus in accordance with still another embodiment of this invention.

When effecting recording subsequent to erasure on a rewritable recording medium 1 consisting of a cut sheet as shown in FIG. 12A, erasure is performed in the direction indicated by the arrow F, and recording is performed in the direction indicated by the arrow H. Or, alternatively, both recording and erasing may be performed in the same direction indicated by the arrow F.

Figure 12B:
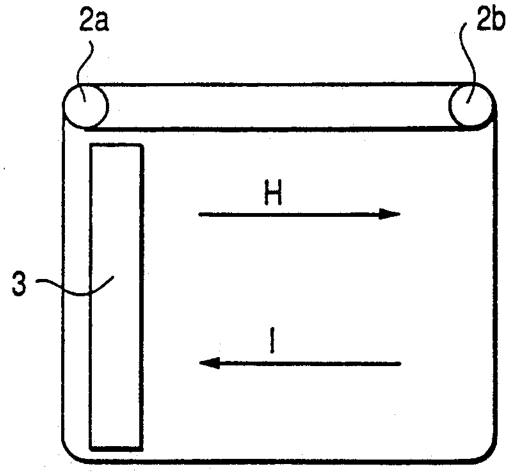

Also in the case where a roll-type rewritable recording medium 1 is used as shown in FIG. 12B, recording is effected in the direction indicated by the arrow H, with erasing being effected in the direction indicated by the arrow I. The feeding direction and the recording/erasion directions for the rewritable recording medium 1 are not restricted to the above mentioned.

While in the embodiment shown in FIG. 4, the operation panel 40 is provided in the apparatus, i.e., attached to the rewritable recording medium 1, the operation of the apparatus may also be performed through remote control or through wire.

While in the above-described embodiments the markers provided on the rewritable recording medium 1 are indicative of recording/erasing start positions, these markers may be recorded at the end of or during a recording/erasing operation, or at a time fixed after the end or before the start of recording/erasing.

While in the above-described embodiments the heating elements of the thermal heads 3, 80 and 81 serving as the heating means are arranged in a row, this should not be construed as restrictive. The heating elements may also be arranged in two or more rows or in a zigzag manner. In the case of an arrangement in two or more rows, it is possible to use one row of heating elements for recording and another row for erasing.

Further, while in the above-described embodiments the recording-energisation control section 34 and the erasure energisation control section 35 are provided as separate components, this should not be construed as restrictive. One control section may serve as both of them. In that case, it is expedient to design the apparatus such that the heating means 3, 80, and 81 can generate, different kinds of heat energy for recording and erasing.

What is claimed is:

1. A method for rewritable recording of information on a recording surface of a rewritable recording film, comprising the sequential steps of:

applying a first type of heat energy used for recording information on said film over an entire recording surface thereof so as to generate a uniform recorded surface;

applying a second type of heat energy used for erasing recorded information from said film over the entire recording surface thereof so as to erase said uniform recorded surface;

applying said first type of heat energy to said film at positions indicated by an information recording signal to record information thereon represented by said recording signal; and erasing said recorded information by applying said second type of heat energy to said film;

wherein said rewritable recording film forms a colored image on the recording surface thereof in response to the application of said first type of heat energy, and erases colored images formed thereon in response to the application of said second type of heat energy, thus allowing repeated recording and erasing of colored images thereon.

2. A recording apparatus for rewritable recording of images on an erasable, rewritable recording film having a recording surface which develops colored recording images thereon in response to an application of a first type of heat energy, and which erases colored recording images recorded thereon in response to an application of a second type of heat energy, thus allowing repeated recording and erasing of colored images thereon, comprising:

heating means for applying heat energy of said first type and second type to said recording film;

recording control means for supplying an image recording signal representing a desired image to said heating means, causing said heating means to apply said first type of heat energy to said recording film at locations corresponding to said desired image;

erasure control means for applying selective image erasing signals representing selected desired ranges of said recording film to be erased, to said heating means which cause said heating means to apply said second type of heat energy to said recording film at locations corresponding to said desired ranges to be erased;

detection means for detecting markers recorded on said recording film and generating position signals corresponding to said markers; and position control means for controlling recording and erasing operations on said recording film in accordance with position signals received from said detection means.

3. An apparatus as claimed in claim 2 further comprising a marker recording means for recording markers at predetermined positions on said rewritable recording film.

4. An apparatus as claimed in claim 2 wherein prior to performing recording by said recording control means unnecessary image portions on said rewritable recording films are erased by said erasure control means.

5. An apparatus as claimed in claim 2 wherein said heating means heats said rewritable recording film such that, assuming that a heating area per pixel for recording is S1 and that a heating area per pixel for erasure is S2, the following relationship holds true: $S1 < S2$.

* * * * *

UNITED STATES PATENT AND TRADEMARK OFFICE
CERTIFICATE OF CORRECTION

PATENT NO. : 5,274,460

DATED : December 28, 1993

INVENTOR(S) : Keiki Yamada et al

It is certified that error appears in the above-indentified patent and that said Letters Patent is hereby corrected as shown below:

Col. 1, line 40, change "erasion" to -- erasing --; Col. 1, line 52, change "apparatuses" to -- apparatus --; Col. 4, line 31, change "erasing" to -- erasure --; Col. 4, line 61, change "erasion" to -- erasing --; Col. 7, line 10, change "e,crc/3/" to -- ③ --; Col. 9, line 5, between "recording" and "erasing" insert -- / --; Col. 9, line 23, change "erasion" to -- erasing --; Col. 10, line 33, change "erasure" to -- erasing --; Col. 13, line 22, change "erasing" to -- erasure --; Col. 13, line 52, change "erasing" to -- erasure --; Col. 13, line 56, change "erasion" to -- erasing --; Col. 15, line 22, change "erasing" to -- erasure --; Col. 15, line 42, delete the comma; Col. 15, line 49, after "may be" delete the comma; Col. 17, line 5, change "erasing" to -- erasure --; Col. 17, line 33, change "erasion" to -- erasing --; Col. 17, line 60, after "generate", delete the comma.

Col. 18, line 64, "<" should be -- ≤ --.

Signed and Sealed this

Twenty-fifth Day of October, 1994

*Attest:*

Bruce Lehman

BRUCE LEHMAN

*Attesting Officer*

*Commissioner of Patents and Trademarks*